US008055766B2

(12) United States Patent
Bloebaum et al.

(10) Patent No.: US 8,055,766 B2
(45) Date of Patent: Nov. 8, 2011

(54) SYSTEMS METHODS AND USER STATE FILES FOR ENABLING INTERACTIONS BETWEEN VIRTUAL AND REAL WORLD IDENTITIES

(75) Inventors: L. Scott Bloebaum, Cary, NC (US); Justin Pierce, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 428 days.

(21) Appl. No.: 12/032,288

(22) Filed: Feb. 15, 2008

(65) Prior Publication Data

US 2009/0209236 A1 Aug. 20, 2009

(51) Int. Cl.
  *G06F 15/173* (2006.01)
  *G06F 15/16* (2006.01)
  *G06Q 40/00* (2006.01)
  *A63F 13/00* (2006.01)

(52) U.S. Cl. ........ 709/224; 709/203; 709/204; 709/207; 709/223; 709/226; 705/39; 463/42

(58) Field of Classification Search .................. 709/203, 709/204, 207, 223, 224, 226; 705/39
See application file for complete search history.

(56) References Cited

U.S. PATENT DOCUMENTS

| 6,015,348 | A | * | 1/2000 | Lambright et al. | 463/42 |
| 6,128,660 | A | * | 10/2000 | Grimm et al. | 709/227 |
| 7,036,082 | B1 | | 4/2006 | Dalrymple et al. | |
| 2001/0037316 | A1 | | 11/2001 | Shiloh | |
| 2002/0090985 | A1 | | 7/2002 | Tochner et al. | |
| 2003/0132853 | A1 | | 7/2003 | Ebert | |
| 2003/0177187 | A1 | * | 9/2003 | Levine et al. | 709/205 |
| 2005/0091272 | A1 | | 4/2005 | Smith et al. | |
| 2006/0075055 | A1 | | 4/2006 | Littlefield | |

(Continued)

FOREIGN PATENT DOCUMENTS

WO   WO 02/42921  A1   5/2002

OTHER PUBLICATIONS

"Vodafone—Second Life," http://secondlife.Vodafone.com/what/aspx, Admitted prior art, Printed from the Internet on Jan. 29, 2008, 5 pages.

(Continued)

*Primary Examiner* — Asad M Nawaz
*Assistant Examiner* — Vitali Korobov
(74) *Attorney, Agent, or Firm* — Myers Bigel Sibley & Sajovec, PA (57) ABSTRACT

Methods for providing a user state file enabling interactions between virtual and real world identities include determining a real world identity of a user and determining a virtual world identity of the user. An associated user designation is provided for a first and a second associated user. A real world identity and/or a virtual world identity is determined for the associated users. The first associated user has at least a real world identity and the second associated user has at least a virtual world identity. A communication history is established between the user and the first and second associated users, the communication history including communications in the real world and/or the virtual world. The user state file is generated based on the determined real world and virtual world identities of the user and the associated users and the communication history between the user and the associated users. The user state file is configured to be accessed by the user in both the real world and the virtual world.

16 Claims, 6 Drawing Sheets

U.S. PATENT DOCUMENTS

| | | | |
|---|---|---|---|
| 2006/0235790 A1* | 10/2006 | Jung et al. | 705/39 |
| 2007/0191100 A1 | 8/2007 | Counts | |
| 2007/0203828 A1* | 8/2007 | Jung et al. | 705/38 |
| 2008/0026845 A1* | 1/2008 | Aguilar et al. | 463/42 |
| 2008/0163075 A1* | 7/2008 | Beck et al. | 715/759 |

OTHER PUBLICATIONS

"Second Life gets its first copyright law suit," The Register, http://www.theregister.co.uk/2007/07/18/ second_life_copyright_suit/print.html, Admitted prior art, Printed from the Internet on Jan. 21, 2008, 3 pages.

Dubner, Stephen J., "Philip Rosedale Answers Your Second Life Questions," http://freakonomics.blogs.nytimes.com/2007/12/13/philip-rosedale-answers-your-second-li..., Admitted prior art, printed from the Internet on Jan. 21, 2008, 4 pages.

"Second Lifers get real world phone lines," http://www.telecoms.com/itmgcontent/tcoms/news/articles/20017487993.html, Admitted prior art, Printed from the Internet on Jan. 21, 2008, 1 page.

"Where Real Money Meets Virtual Reality, The Jury Is Still Out," http://www.washingtonpost.com/wp-dyn/content/article/2006/12/25/AR2006122500635_2..., Admitted prior art, Printed from the Internet on Jan. 21, 2008, 3 pages.

Kushner, David, "Winner: Make Your Very Own Virtual World with OLIVE," http://www.spectrum.ieee.org/print/5838, Admitted prior art, Printed from the Internet on Jan. 21, 2008, 4 pages.

Metz, Cade, "Second Life will dwarf the web in ten years," http://www.theregister.co.uk/2007/08/01/second_life_to_dwarf_web_in_ten_years/print.ht..., Admitted prior art, Printed from the Internet on Jan. 21, 2008, 3 pages.

International Search Report and Written Opinion (14 pages) corresponding to International Application No. PCT/US2008/009846; Mailing Date: Apr. 27, 2009.

International Search Report and Written Opinion (13 pages) corresponding to International Application No. PCT/US2008/009847; Mailing Date: May 20, 2009.

* cited by examiner

Figure 1

| USER A REAL WORLD IDENTITY 210 |
|---|
| USER A VIRTUAL WORLD IDENTITY 215 |
| USER A SUPPLEMENTAL STATE INFORMATION 220 |
| USER B DESIGNATION 225 |
| USER B REAL WORLD IDENTITY 230 |
| USER B VIRTUAL WORLD IDENTITY 235 |
| USER B SUPPLEMENTAL STATE INFORMATION 240 |
| USER A/B COMMUNICATION HISTORY 245 |
| USER C DESIGNATION 250 |
| USER C REAL WORLD IDENTITY 255 |
| USER C VIRTUAL WORLD IDENTITY 260 |
| USER C SUPPLEMENTAL STATE INFORMATION 265 |
| USER A/C COMMUNICATION HISTORY 270 |
| • • • |

SYSTEMS METHODS AND USER STATE FILES FOR ENABLING INTERACTIONS BETWEEN VIRTUAL AND REAL WORLD IDENTITIES

FIELD OF THE INVENTION

The present invention relates to electronic devices and, more particularly, to electronic devices, methods and computer program products for use by real and virtual world identities.

BACKGROUND

The use of electronic devices such as computers and other processor based devices continues to expand. In addition, communication and interaction between such devices is also extensive, using both wireless and wired connections to a world wide network (internet) based on the Internet Protocol (IP).

Various vendors have sought to take advantage of the variety of services offered using this extensive network of connected devices. For example, Apple Corporation has introduced products extending across a "triangle" including portable entertainment devices (iPod/iPhone™); fixed, or at least less-portable, computing device for internet access, collaboration, and content creation (iMac™, PowerBook™); and an internet source for content (iTunes™ for music and videos).

In addition to entertainment uses, such as addressed by Apple Corporation, increasing processor capabilities and memory of server devices coupled to the internet has allowed for the introduction of a variety of "virtual" world environments. Such environments include online gaming environments and the like, where remotely located game participants may participate together in a common game, the state of which game becomes a "virtual" world in which each participant is represented by an "avatar" having a state (e.g., location, armament, health etc.). A variant on such a gaming environment are virtual worlds, such as Second Life® from Linden Labs®. In Second Life®, users may create avatars that may shop, operate businesses, listen to music and the like, while interacting with avatars of other users. It has been proposed that avatars should be provided that may exist in multiple different ones of such virtual worlds. It has further been proposed that virtual mobile terminals should be available for avatars in such virtual worlds that are able to send text messages to recipients in the real world. Thus, such virtual worlds continue to become more sophisticated.

SUMMARY

In some embodiments of the present invention, methods for providing a user state file enabling interactions between virtual and real world identities include determining a real world identity of a user and determining a virtual world identity of the user. An associated user designation is provided for a first and a second associated user. A real world identity and/or a virtual world identity is determined for the associated users. The first associated user has at least a real world identity and the second associated user has at least a virtual world identity. A communication history is established between the user and the first and second associated users, the communication history including communications in the real world and/or the virtual world. The user state file is generated based on the determined real world and virtual world identities of the user and the associated users and the communication history between the user and the associated users. The user state file is configured to be accessed by the user in both the real world and the virtual world.

In other embodiments, providing an associated user designation and determining a real world identity and a virtual world identity and establishing a communication history are carried out for a plurality of associated users, including the first and second associated users. Generating the user state file includes generating the user state file including the real world and virtual world identities and the communication histories for each of the associated users grouped by the associated user designations for each of the plurality of associated users. Supplemental state information associated with the real and/or virtual world identity of the user may be determined and generating the user state file may include generating the user state file including the determined supplemental state information.

In further embodiments, generating the user state file is followed by detecting a communication between the user and one of the associated users in the real world and/or the virtual world and updating the user state file to include the detected communication in the communication history between the user and the one of the associated users. Detecting a communication between the user and the one of the associated users in the real world and/or the virtual world may include detecting a first communication between the user and the one of the associated users in the real world and detecting a second communication between the user and another one of the associated users in the virtual world. Updating the user state file may include updating the user state file to include the detected communications.

In other embodiments, the first communication may be a voice call, a text message or an instant message (IM) and the second communication may be an interaction among avatars associated with the user and the another one of the associated users in a persistent virtual space or an interaction between the user and the another one of the associated users in a virtual space of limited time duration. The second communication may be a virtual world status of a game being played in the limited duration virtual space, a proposed transaction between the avatars in the persistent virtual space, a transaction between the avatars in the persistent virtual space or an appointment between the avatars in the persistent virtual space.

In further embodiments, generating the user state file is followed by receiving a communication in the real world and/or virtual world from the first and or the second associated user and mapping an identification of the first or second associated user from the received communication to the associated user designation for the identified first or second associated user. The determined real world identity of the identified first or second associated user, the virtual world identity of the identified first or second associated user and/or the communication history between the user and the identified first or second associated user from the user state file based on the associated user designation for the associated user is retrieved and the retrieved determined real world identity of the identified first or second associated user, the virtual world identity of the identified first or second associated user and/or the communication history between the user and the identified first or second associated user is displayed to the user without displaying the communication history between the user and the other of the associated users.

In yet other embodiments, displaying the retrieved determined real world identity of the identified first or second associated user, the virtual world identity of the identified first or second associated user and/or the communication history between the user and the identified first or second associated user to the user is preceded by receiving a request from the user to display information about the identified first or second associated user from the user state file. The retrieved determined real world identity of the identified first or second associated user, the virtual world identity of the identified first or second associated user and/or the communication history between the user and the identified first or second associated user is displayed to the user responsive to the received request.

In other embodiments, generating the user state file is followed by detecting an interaction between the user and a third associated user in the real world and/or virtual world and providing an associated user designation for the third associated user. A real world identity and/or a virtual world identity is determined for the third associated user. A communication history is established between the user and the third associated user, the communication history including communications in both the real world and the virtual world. The user state file is updated based on the determined real world and virtual world identities of the third associated user and the communication history between the user and the third associated user responsive to detecting the interaction. The real world and virtual world identities and the communication histories for the first, second and third associated users are grouped by the associated user designation for each of the first, second and third associated users.

In further embodiments, generating the user state file is performed on a first platform associated with either the real world identity or the virtual world identity of the user and the method further includes storing the user state file on the first platform. A communication connection is detected between the first platform and a second platform associated with the other of the real world identity or the virtual world identity of the user. The user state file is transferred to the second platform to synchronize the user state file with another copy of the user state file resident on the second platform.

In other embodiments, generating the user state file is performed on a first platform associated with either the real world identity or the virtual world identity of the user and the method further includes storing the user state file as a master user state file on a master platform operatively coupled to the first platform and to a second platform associated with the other of the real world identity or the virtual world identity of the user. A communication connection is then detected between the first platform and the master platform and the user state file on the first platform is synchronized with the master user state file.

In yet further embodiments, generating the user state file is followed by transmitting instructions to the virtual world identity of the user from a first platform associated with the real world identity of the user based on the user state file. A communication connection is then established to a second platform associated with the virtual world identity of the user. A status of completion of the transmitted instructions is determined based on the user state file. Additional instructions are transmitted to the virtual world identity of the user based on the user state file and the status of completion of the transmitted instructions. The first platform may be a mobile terminal and the second platform may be a game console.

In other embodiments, methods for enabling interactions between a first user and identities in a virtual world and a real world include receiving a communication in the real world and/or virtual world. The received communication includes an identification of a second user. A real world identity of the second user, a virtual world identity of the second user and/or a communication history between the first user and the second user is retrieved from a user state file based on the received identification of the second user from the received communication. The user state file includes a history of real world and virtual world communications between the first user and the second user. The retrieved real world identity of the second user, the virtual world identity of the second user and/or the communication history between the first user and the second user is displayed to the first user. The display may be responsive to a request received from the user.

Communication systems, wireless mobile terminals and computer program products configured to carry out the described methods are also provided. The computer program products may include computer program code embodied in a computer readable medium that is configured to carry out the methods.

In yet other embodiments, a user state file for use in enabling interactions between virtual and real world identities is provided. The user state file includes real world and virtual world identities of a first user, real world and virtual world identities of a plurality of associated users and a plurality of communication histories between the first user and respective ones of the associated users. The user state file is configured to be accessed by the first user in both the real world and the virtual world.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Some embodiments of the present invention may support a product value "triangle" of mobile terminals, gaming consoles (e.g., Sony Corporation's PS3), and virtual environments for gaming, collaboration, and interaction (e.g., Sony Corporation's Playstation Home and Playstation Network). Systems utilizing mobile terminals and gaming consoles for maintaining unified personal and/or virtual identities and information to be used for interaction in both real and virtual (on-line) environments and methods for the same are provided by some embodiments of the present invention.

Thus, in some embodiments, an individual (user) is able to maintain consistency between his or her identity in both the real and virtual worlds, and is able to communicate and collaborate in both worlds with others having this same capability. In the real world, for example, communication or collaboration may include phone calls, text messages, IM, content sharing, or other forms of communication. Likewise, collaboration in the virtual world may include interaction among avatars in a persistent virtual space (e.g., Second Life or Playstation Home) or engaging in multi-player on-line games of temporary duration, both of which may involve communication between individuals. As will be described herein, both of these may be unified in what will be called a user state file that may include, for example, information about activities, preferences, or transactions (e.g., content purchased) of the individual ("User A") within both the real and virtual worlds. In addition, for each of a plurality of other users within the individual's sphere ("Users B-Z"), information may be provided about the state of User A's communications with the respective other users. For instance, this state may include a real-world history of calls, text messages, IM's, etc. and virtual-world status of any games being played, transactions contemplated (e.g., Second Life "real estate" purchase), appointments, and the like between User A and each of Users B-Z.

As User A participates, communicates, or collaborates in either the real or the virtual world, his or her user state file may be updated accordingly. As User A encounters new individuals with presence in both worlds, User A may create new entries in their user state file for those individuals. In some embodiments, User A may move his or her user state file among different platforms for communication and collaboration. This is illustrated by reference to the system shown in FIG. 1 below. For instance, User A may have both a mobile phone (mobile terminal) and a gaming console (e.g., Playstation 3). User A may use the mobile phone and network for real-world interaction with User B (e.g., calls or IM's when out and about during the day), but prefers to use the gaming console for virtual-world collaboration and on-line gaming due to its superior capabilities (e.g., when at home later in the evening). When User A wishes to transition to the virtual world, he or she may connect the phone to the gaming console by either a wired or a wireless connection. An application common to both devices may then establish the connection and transfer User A's user state file, updated based on his real-world activities during the day, from the mobile phone into the gaming console. User A may then commence virtual-world activities based on that user state file. When User A is finished in the virtual world, the application may transfer the updated user state file back to the phone, ready to be accessed via the real or virtual world. A master user state file may be stored at a location that is accessible by both real and virtual world associated devices.

Figure 1:
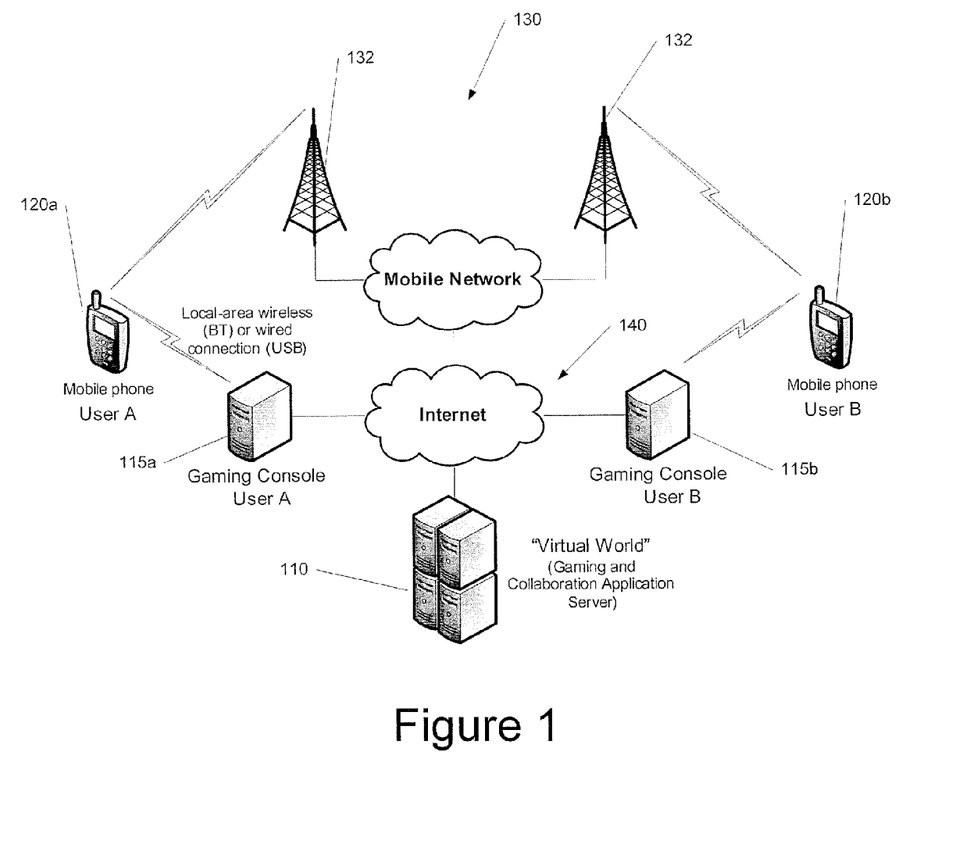
FIG. 1 is a schematic diagram of a communication environment supporting real and virtual world identities according to some embodiments of the present invention.

Some embodiments of the present invention will now be further described below with respect to FIGS. 1-9. FIG. 1 is a schematic diagram illustrating a communication environment supporting real and virtual world identities that is configured to enable interactions between virtual and real world identities according to some embodiments of the present invention. As shown in the embodiments of FIG. 1, a first user (User A) has a first platform, shown as mobile terminal 120a, and a second associated platform, shown as a gaming console 115b. A second exemplary user (User B) is shown in FIG. 1 as having a first platform, shown as a mobile terminal 120b, and a second platform, shown as a gaming console 115b. The gaming consoles 115a, 115b are communicatively coupled as schematically illustrated by the wide area network (internet) 140. The mobile terminals 120a, 120b are shown as being communicatively coupled to the wide area network 140 through the mobile network 130, including cellular towers 132.

As further seen in the embodiments of FIG. 1, them mobile terminals 120a, 120b may be communicatively connected locally to the respective gaming consoles 115a, 115b. As also shown in FIG. 1, a server 110 is illustrated that is configured to support a virtual world, such as a gaming and/or collaboration application. Operations for enabling interaction between virtual and real world identities of the embodiments illustrated in the communication environment of FIG. 1 will be further described with reference to the flowcharts of FIGS. 3-9.

Figure 2:
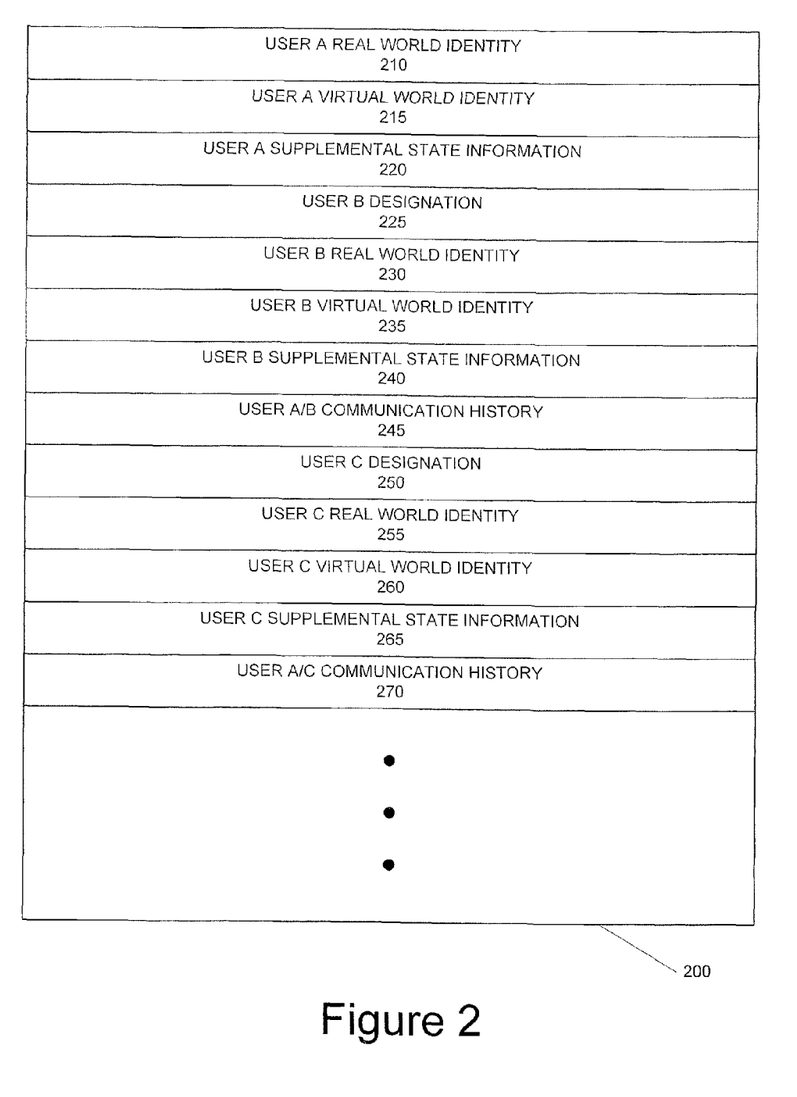
FIG. 2 is a schematic diagram of a user state file according to some embodiments of the present invention.

FIG. 2 is a schematic diagram of a user's state file for use in enabling interaction between virtual and real world identities according to some embodiments of the present invention. As shown in the embodiments of FIG. 2, the user's state file 200 includes a real world identity 210 and a virtual world identity 215 associated with a user, (User A). Also shown with respect to User A in the embodiments of FIG. 2 is supplemental state information 220 for User A. Such supplemental state information 220 may include state information not dependent on a communication with another associated user, such as preferences, which supplemental state information 220 may relate to the real world identity and/or the virtual world identity of User A. As described above, the user state file 200 may include information about various other users within User A's personal sphere (i.e., associated with User A in some form in the real world and/or the virtual world). Two such users are illustrated in the user state file 200 in FIG. 2, User B and User C. A real world identity 230, 250 and virtual world identity 235, 255 is shown as stored in the user state file 200 for each of User B and User C. Each of User B and User C further also has supplemental state information 240, 265.

In addition to such described information, which generally corresponds to the type of information described previously with respect to the User A entries 210, 215, 220, for each of the other users within User A's sphere, a communication history 245, 270 is provided including information about the state and history of User A's communications/interactions with the respective users. For example, entries in the communication history 245, 270 may include a real world history of calls, text messages, IMs and the like and/or a virtual world status of games being played, transactions contemplated, appointments and the like. The user state file 200 is configured to be accessed by User A in both the real world and the virtual world.

Also shown in the user state file 200 of the embodiments of FIG. 2 is an associated user designation 225, 250 for each of the associated users illustrated in FIG. 2. In the file structure shown in FIG. 2, the user designation 225, 250 may be used to organize storage and retrieval of information with respect to a particular associated user from among a plurality of associated users stored in User A's user state file 200. However, it will be understood that the associated user designation 225, 250 need not be a unique, separately created identification. In other words, a real world identity 230, 255 or virtual world identity 235, 260 for the respective users may also serve as the associated user designation for the respective users. For example, a user having an Avatar named "Hero" may be assigned an associated user designation of "Hero" as well. User A may similarly have a user designation in User A's user state file 200. It will further be understood that, while the user state file 200 includes identification and communications history information in respect to both the real world and the virtual world (or virtual worlds associated with User A), individual ones of the associated users may have identities in the real world, the virtual world or both the real and virtual worlds. Furthermore, a user may have a plurality of identities in each or both of the respective real/virtual worlds. In other words, for example, a user may have an identifier associated with a Playstation gaming scenario and a distinct identification associated with a Second Life® avatar of the respective user.

It will further be understood that the real world identity itself may be an alias so as to protect the privacy of the respective users. In other words, various of the associated users and/or User A may prefer to have their identity remain confidential and may create an alias for use in reference to the respective users in the real world so that the anonymity associated with the avatars in the virtual world will similarly apply to provide privacy in the real world. Conventionally known protocols and procedures restricting access to the information in the user state file 200, the right to obtain and add included information about respective ones of the users included and the like may be applied to control privacy and rights in generation of respective user state files for various users to insure improved access to communications and interactions in a manner that respects the preferences and privacy of the respective users. Details of such control need not be provided herein.

Figure 3:
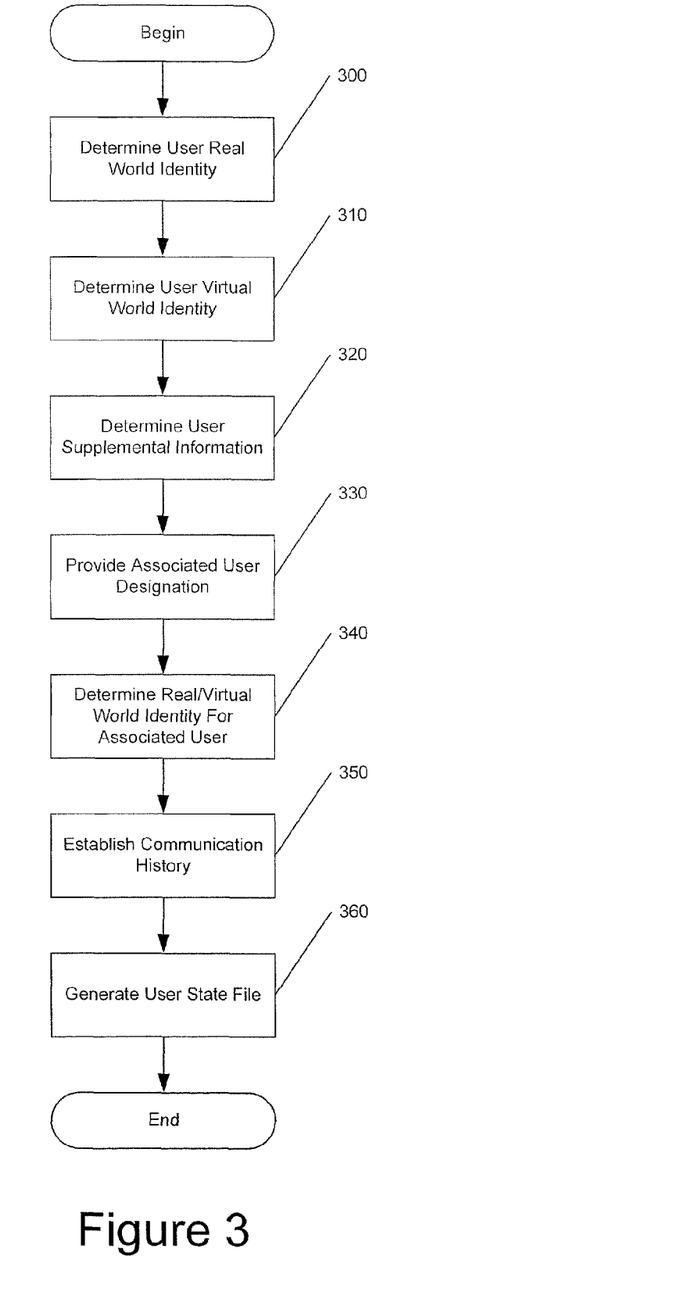
FIG. 3 is a flowchart illustrating methods for providing a user state file in accordance with some embodiments of the present invention.

A method for providing a user state file, such as the user state file 200 of FIG. 2, enabling interaction between virtual and real world identities according to some embodiments of the present invention will now be described with reference to the flowchart illustration of FIG. 3. As shown in the embodiments of FIG. 3, operations begin by determining a real world identity of a user (block 300). A virtual world identity is also determined for the user (block 310). In some embodiments, as shown in FIG. 3, supplemental state information associated with the real and/or virtual world identity of the user is also determined (block 320).

An associated user designation is provided for another user associated with the first user (block 330). A real world identity and/or virtual world identity for the associated user is determined (block 340). In addition, a communication history between the first user and the associated user is established (block 350). The communication history established at block 350 includes communications in both the real world and the virtual world.

The user state file 200 is generated based on the information gathered at blocks 300-350 (block 360). More particularly, the user state file 200 generated at block 360 includes information related to both the virtual world and the real world and can be accessed by the first user in both the real world and the virtual world. Thus, a common information resource is provided that may include real world information, such as phone calls, text messages, IM, content sharing or the like as well as information related to collaboration and inter-action among avatars in a persistent virtual world and/or interactions in a temporary duration virtual world, such as an on-line multi-player game space. As such, some embodiments of the present invention may provide a unified user state file as illustrated, for example, in FIG. 2. Furthermore, it will be understood that, while operations for generating entries for an associated user are shown at blocks 330-350 for a single associated user, embodiments of the present invention include determining such information for a plurality of associated users and grouping that information in a user state file in block 360. It will be understood, however, that the present invention is not limited to embodiments where the user state file 200 is a single physical file entry on a processor based electronic device but may represent a plurality of distinct files with respect, for example, to different ones of the user, types of information and/or the like so long as the configuration thereof allows access to support operations for enabling interactions between virtual and real world identities as described subsequently herein.

Methods for updating a user state file according to various embodiments of the present invention will now be described with reference to the flowchart illustrations of FIGS. 4 and 5. Referring first to the embodiments of FIG. 4, a communication between a first user and an associated user in the real world and/or virtual world is detected (or received) at block 400. In some embodiments, both real world and virtual world communications are detected/received at block 400. For example, in the real world, a respective communication may be a voice call, a text message or an instant message (IM). In the virtual world, the detected or received communication may be an interaction among avatars associated with the first user and with the associated user in its persistent virtual space and/or may be an engagement between the user and the associated user in an electronic game space of limited time duration. For example, the communication detected in the virtual world may be a virtual world status of a game being played in the game space, a proposed transaction between the avatars in the persistent virtual space, a transaction between the avatars the persistent virtual space, an appointment between avatars in the persistent virtual space and/or the like.

An identification of the associated user from the received communication is mapped to an associated user designation for the associated user (block 410). The real world identity of the associated user, the virtual world of the associated user and/or a communication history between the first user and the associated user is retrieved from the user's state file based on the associated user designation for the associated user (block 420).

Figure 4:
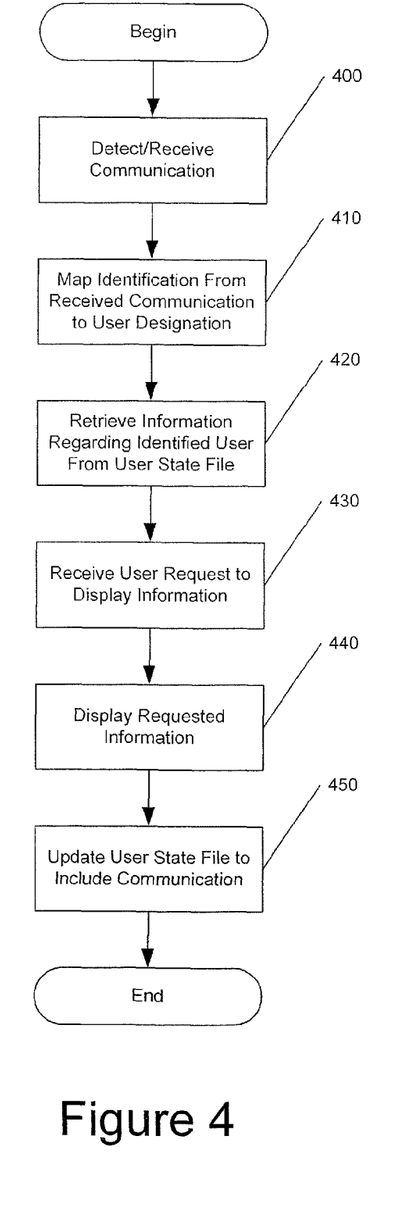
FIG. 4 is a flowchart illustrating methods for updating a user state file in accordance with some embodiments of the present invention.

For some embodiments, as illustrated in FIG. 4, a request is then received from the first user to display the retrieved information about the associated user from the user state file (block 430). However, it will be understood that the retrieved information may be displayed as a default without awaiting receipt of a request from the first user.

The real world identity of the associated user, the virtual world identity of the associated user and/or the communication history between the user and the associated user is displayed to the first user responsive to the received request from block 430 (block 440). In some embodiments, as also illustrated in FIG. 4, the user state file is updated to include the detected/received communication in the communication history record between the first user and the associated user in the user state file (block 450).

Figure 5:
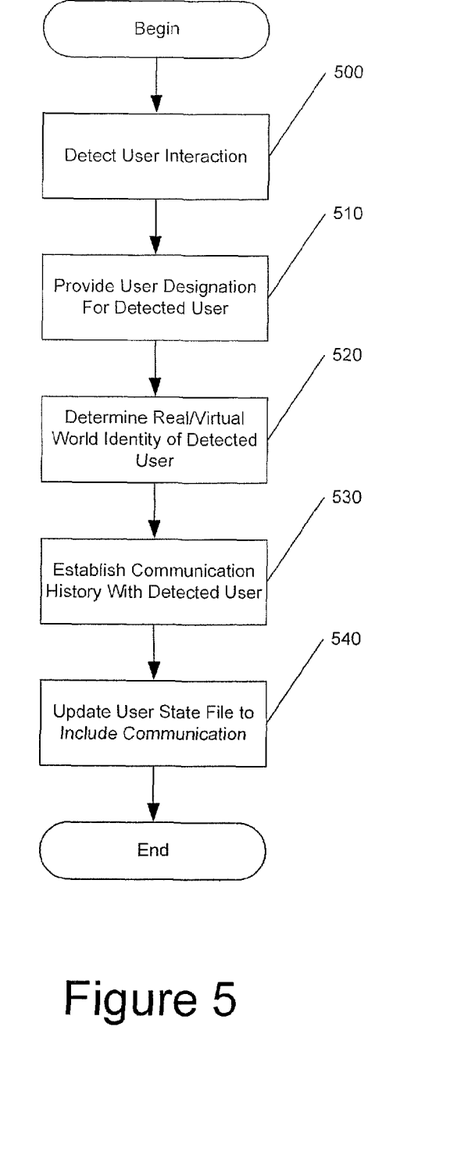
FIG. 5 is a flowchart illustrating methods for updating a user state file in accordance with some embodiments of the present invention.

Referring now to the flowchart illustrations of FIG. 5, operations for the illustrated embodiments begin by detecting an inter action between a first user and a second associated user in the real world and/or the virtual world (block 500). An associated user designation is provided for the second associated user (block 510). In other words, as described for the embodiments in FIG. 5, a user having a user state file including a plurality of associated users may identify and add an additional associated user based on interaction experience therewith as will now be further described. Thus, the first user may create new entries in their respective first user state file for newly encountered individuals having roots in either or both real and virtual worlds shared with the first user.

A real world identity and/or a virtual world identity is determined for the new associated user (block 520). In addition, a communication history between the first user and the new associated user is established (block 530). The communication history may include communications in both the real world and the virtual world between the respective users.

As also shown in the embodiments of FIG. 5, the user state file for the first user may then be updated based on the information gathered at block 510-530 (block 540). The updating of the user state file may be triggered responsive to detecting an interaction between the first user and the new associated user at block 500 and the respective ones of the associated users may have their information grouped by their associated user designations. It will be understood that, in some embodiments, the first user may participate in the decision making process used in generating an updated user state file. For example, the user may be given the option to not include a new associated user encountered in the real world and/or virtual world in the user state file.

Figure 6:
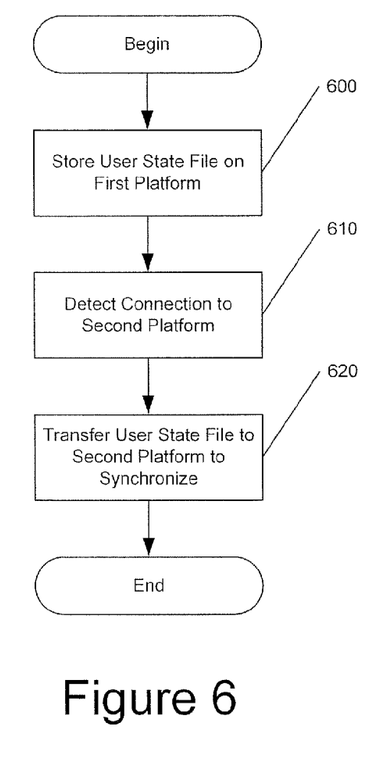
FIG. 6 is a flowchart illustrating methods for synchronizing user state files across platforms in accordance with some embodiments of the present invention.
Figure 7:
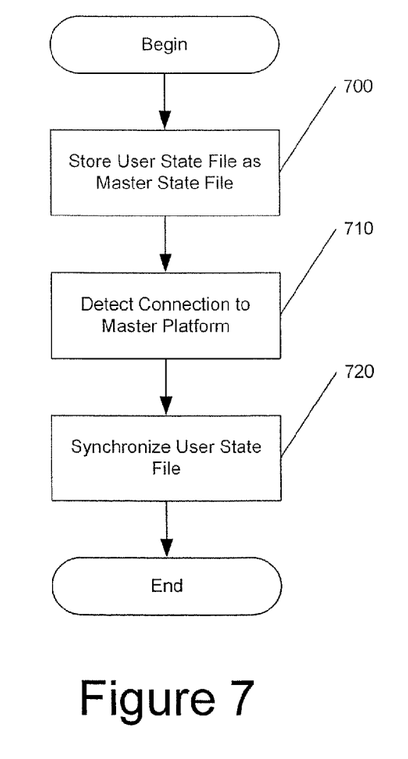
FIG. 7 is a flowchart illustrating methods for synchronizing user state files across platforms in accordance with further embodiments of the present invention.

Methods for synchronizing user state files across platforms in accordance with various embodiments of the present invention will now be further described with reference to the flowchart illustrations of FIGS. 6 and 7. The embodiments described with reference to FIG. 6 differ from those in FIG. 7 in that the embodiments of FIG. 7 make use of a master user state file that may be stored remotely from platforms associated with the user, such as the mobile phone 120a and gaming console 115a of FIG. 1. The remotely stored but accessible master user state file may then be accessed by the various platform devices as needed for synchronization purposes. Referring now to FIG. 6, operations begin by storing the user state file on a first platform of the user, such as the mobile terminal 120a (block 600). A communication connection between the first platform and a second platform, such as the gaming console 115a is detected (block 610). For example, as shown in FIG. 1, a local area wireless or wired connection may be established between the mobile terminal 120a and the gaming console 115a. It will be further understood that the first platform, such as the mobile terminal 120a, may be associated with a real world identity of the user while the second platform, such as the gaming console 115a, may be associated with a virtual world identity of the user.

It will be understood that the second terminal may not be a gaming console as illustrated in FIG. 2 and may be, for example, a personal computer, laptop or the like allowing interaction through the internet 140 to a virtual world in which the user has an avatar (identity) supported by the server 110. Similarly, the real world platform may be a personal computer, laptop or the like rather than a mobile terminal as illustrated in FIG. 2. Accordingly, it will be understood that the respective platforms may, in some embodiments, support both virtual and real world interactions rather than being uniquely associated with either the real or the virtual world identity of a user. In any event, as further illustrated for the embodiments of FIG. 6, the user state file is transferred to the second platform to synchronize the user state file with another copy of the user state file already resident on the second platform (block 620). It will be understood that operations at block 620 when referring to first or second platforms may provide synchronization on either or both of the respective platforms.

Further embodiments relating to synchronizing user state files will now be described with reference to the flowchart illustration of FIG. 700. For the embodiments shown in FIG. 700, operations begin by storing the user state file as a master state file on a master platform operatively coupled to the first platform and operatively coupled to one or more other platforms associated with the real or virtual world identity of the users. For example, the master state file could be maintained on a server, such as the server 110 of FIG. 1, and may be communicatively coupled to both the mobile terminal 120a and the gaming console 115a. A communication connection between a platform 120a or the gaming console 115a and a master platform, such as the server 110, is detected (block 710). The user state file on the mobile terminal 120a and/or the gaming console 115a is then synchronized with the master user state file (block 720).

Methods for enabling interactions between user identities in real and virtual worlds in accordance with various embodiments of the present invention will now be described further with reference to the flowchart diagrams of FIGS. 8 and 9. Referring first to the embodiments of FIG. 8, operations begin by transmitting instructions to the virtual world identity of the user from the first platform associated with the real world identity of the user based on the user state file (block 800). In other words, while outside of the virtual world, and in the real world, a user may communicate or send instructions to complete some task or the like to an avatar or virtual identity through a platform, such as the mobile terminal 120a. The instructions may, for example, be sent through the mobile network 130 using short message service (SMS), text messaging, voice and/or the like.

Figure 8:
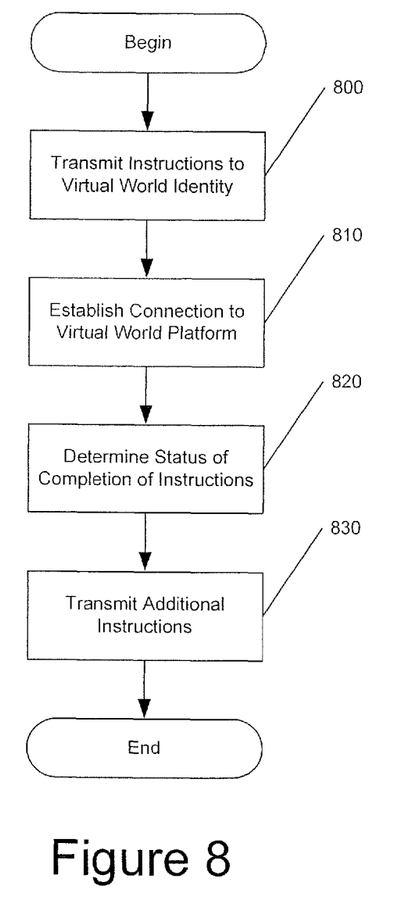
FIG. 8 is a flowchart illustrating methods for enabling interactions between user identities in real and virtual worlds in accordance with some embodiments of the present invention.

For the embodiments illustrated in FIG. 8, a communication connection may be established from the first platform to a second platform associated with the virtual world identity user (block 810). The status of completion of the transmitted instructions may then be determined based on the user state file (block 820). It will be understood, however, that the first and second platform may be the same platform for monitoring status of instructions where the first platform, such as the mobile terminal 120a, may access a server supporting the virtual world, such as the server 120 through a platform, such as the gaming console 115a or through the mobile network 130, both of which may provide access to the wide area network (internet) 140. Thus, a user could check through the mobile terminal 120a to monitor progress of an instruction, send further instructions and/or the like. Thus, as shown in the embodiments of FIG. 8, additional instructions may be transmitted to the virtual world identity of the user based on the user state file and the determined status of completion of the transmitted instructions (block 830). It will further be understood that, when the user, for example, returns home later in an evening during which interactions have occurred using the mobile terminal 120a, the user may connect the mobile terminal 120a to the gaming console 115a and transition into the virtual world to interact with/through the user's avatar or virtual identity.

Figure 9:
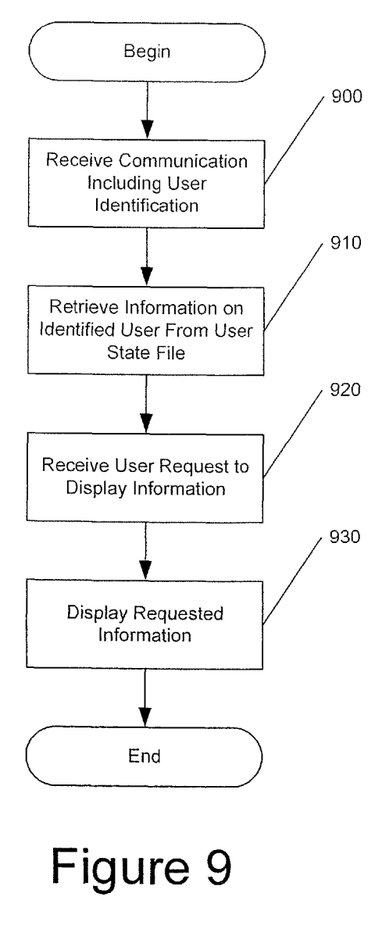
FIG. 9 is a flowchart illustrating methods for enabling interactions between user identities in real and virtual worlds in accordance with further embodiments of the present invention.

Referring now to the embodiments illustrated in FIG. 9, operations begin by receiving a communication in the real world and/or the virtual world (block 900). A received communication includes an identification of a second user. Information regarding the (second) identified user is retrieved (block 910). For example, a real world identity of the second user, a virtual world identity of the second user and/or a communication history between the first user and the second user may be retrieved from a user state file, such as the user state file 200 of FIG. 2.

In the embodiments illustrated in FIG. 9, a request is received from the user to display information about the second user from the user state file (block 920). Retrieved information, such as real world or virtual world identity and/or a communication history between the respective users, is displayed responsive to the received request (block 930). The display may include information about both real world and virtual world interactions (communications) between the respective users as described previously. Thus, as described with respect to various embodiments above, the user state file 200 may support further operations enabling interaction in both real and virtual environments based on unified, real and virtual identities for a user and associated users in a user's real and/or virtual interaction environment.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method for providing a user state file enabling interactions between virtual and real world identities, the method comprising:
    determining a real world identity of a user;
    determining a virtual world identity of the user;
    providing an associated user designation for a first and a second associated user;
    determining at least one of a real world identity or a virtual world identity for the associated users, wherein the first associated user has at least a real world identity and the second associated user has at least a virtual world identity;
    establishing a communication history between the user and the first and second associated users, the communication history including communications in at least one of the real world or the virtual world;
    generating the user state file based on the determined real world and virtual world identities of the user and the associated users and the communication history between the user and the associated users, wherein the user state file is configured to be accessed by the user in both the real world and the virtual world, and wherein generating the user state file is performed on a first platform associated with either the real world identity or the virtual world identity of the user;
    storing the user state file on the first platform;
    detecting a communication connection between the first platform and a second platform associated with the other of the real world identity or the virtual world identity of the user; and
    transferring the user state file to the second platform to synchronize the user state file with another copy of the user state file resident on the second platform.

2. The method of claim 1, wherein providing an associated user designation and determining a real world identity and a virtual world identity and establishing a communication history are carried out for a plurality of associated users, including the first and second associated users, and wherein generating the user state file includes generating the user state file including the real world and virtual world identities and the communication histories for each of the associated users grouped by the associated user designations for each of the plurality of associated users.

3. The method of claim 2, wherein the method further comprises determining supplemental state information associated with at least one of the real or the virtual world identity of the user and wherein generating the user state file includes generating the user state file including the determined supplemental state information.

4. The method of claim 2, wherein generating the user state file is followed by:
    detecting a communication between the user and one of the associated users in at least one of the real world or the virtual world; and
    updating the user state file to include the detected communication in the communication history between the user and the one of the associated users.

5. The method of claim 4, wherein detecting a communication between the user and the one of the associated users in at least one of the real world or the virtual world comprises detecting a first communication between the user and the one of the associated users in the real world and detecting a second communication between the user and another one of the associated users in the virtual world and wherein updating the user state file includes updating the user state file to include the detected communications.

6. The method of claim 5, wherein:
    the first communication comprises a voice call, a text message or an instant message (IM); and
    the second communication comprises an interaction among avatars associated with the user and the another one of the associated users in a persistent virtual space or an interaction between the user and the another one of the associated users in a virtual space of limited time duration.

7. The method of claim 6, wherein the second communication comprises a virtual world status of a game being played in the limited duration virtual space, a proposed transaction between the avatars in the persistent virtual space, a transaction between the avatars in the persistent virtual space or an appointment between the avatars in the persistent virtual space.

8. The method of claim 1, wherein generating the user state file is followed by:
    receiving a communication in at least one of the real world or the virtual world from at least one of the first or the second associated user;
    mapping an identification of the first or second associated user from the received communication to the associated user designation for the identified first or second associated user;
    retrieving at least one of the determined real world identity of the identified first or second associated user, the virtual world identity of the identified first or second associated user, or the communication history between the user and the identified first or second associated user from the user state file based on the associated user designation for the associated user; and
    displaying the retrieved at least one of the determined real world identity of the identified first or second associated user, the virtual world identity of the identified first or second associated user, or the communication history between the user and the identified first or second associated user to the user without displaying the communication history between the user and the other of the associated users.

9. The method of claim 8, wherein displaying the retrieved at least one of the determined real world identity of the identified first or second associated user, the virtual world identity of the identified first or second associated user, or the communication history between the user and the identified first or second associated user to the user is preceded by receiving a request from the user to display information about the identified first or second associated user from the user state file and wherein displaying the retrieved at least one of the determined real world identity of the identified first or second associated user, the virtual world identity of the identified first or second associated user, or the communication history between the user and the identified first or second associated user to the user comprises displaying the retrieved at least one of the determined real world identity of the identified first or second associated user, the virtual world identity of the identified first or second associated user, or the communication history between the user and the identified first or second associated user to the user responsive to the received request.

10. The method of claim 1, wherein generating the user state file is followed by:
- detecting an interaction between the user and a third associated user in at least one of the real world or the virtual world;
- providing an associated user designation for the third associated user;
- determining at least one of a real world identity or a virtual world identity for the third associated user;
- establishing a communication history between the user and the third associated user, the communication history including communications in both the real world and the virtual world; and
- updating the user state file based on the determined real world and virtual world identities of the third associated user and the communication history between the user and the third associated user responsive to detecting the interaction, wherein the real world and virtual world identities and the communication histories for the first, second and third associated users are grouped by the associated user designation for each of the first, second and third associated users.

11. The method of claim 1, wherein generating the user state file is performed on a first platform associated with either the real world identity or the virtual world identity of the user and wherein the method further comprises:
- storing the user state file as a master user state file on a master platform operatively coupled to the first platform and to a second platform associated with the other of the real world identity or the virtual world identity of the user; and then
- detecting a communication connection between the first platform and the master platform; and
- synchronizing the user state file on the first platform with the master user state file.

12. The method of claim 1, wherein generating the user state file is followed by:
- transmitting instructions to the virtual world identity of the user from a first platform associated with the real world identity of the user based on the user state file; and then
- establishing a communication connection to a second platform associated with the virtual world identity of the user;
- determining a status of completion of the transmitted instructions based on the user state file; and
- transmitting additional instructions to the virtual world identity of the user based on the user state file and the status of completion of the transmitted instructions.

13. The method of claim 12, wherein the first platform comprises a mobile terminal and the second platform comprises a game console.

14. A communication system comprising a first platform associated with either a real world identity or a virtual world identity of a user and a second platform associated with the other of the real world identity or the virtual world identity of the user, wherein the communication system is configured to carry out the method of claim 1.

15. A computer program product for providing a user state file enabling interactions between virtual and real world identities, the computer program product comprising computer program code embodied in a non-transitory computer readable medium, the computer program code comprising program code configured to carry out the method of claim 1.

16. A wireless mobile terminal configured to carry out the method of claim 1.

* * * * *